(No Model.)

J. L. ABELL.
STRAINER FOR LIQUIDS.

No. 321,877. Patented July 7, 1885.

Witnesses;
Robt Huston
Frank Williams

Inventor
Joshua L. Abell
per Wm Zimmerman
Attorney

UNITED STATES PATENT OFFICE.

JOSHUA L. ABELL, OF CHICAGO, ILLINOIS.

STRAINER FOR LIQUIDS.

SPECIFICATION forming part of Letters Patent No. 321,877, dated July 7, 1885.

Application filed January 12, 1885. (No model.)

*To all whom it may concern:*

Be it known that I, JOSHUA L. ABELL, a citizen of the United States, residing at Chicago, in the county of Cook and State of Illinois, have invented certain new and useful Improvements in Strainers for Liquids, which are fully set forth in the following specification, reference being had to the accompanying drawings, forming a part hereof, and in which—

Figure 1:
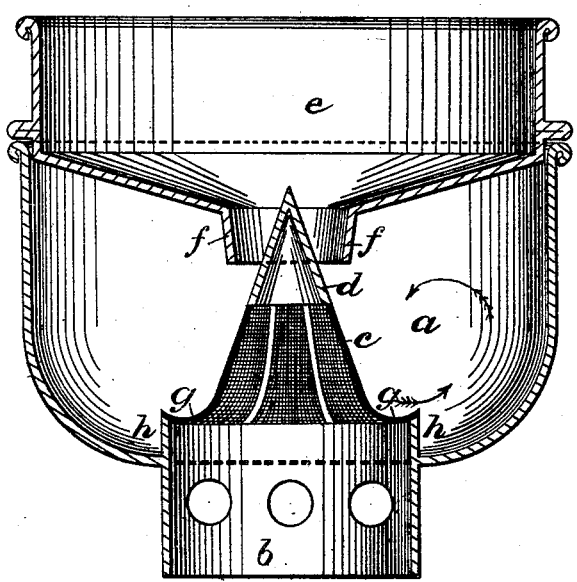
Figure 4:
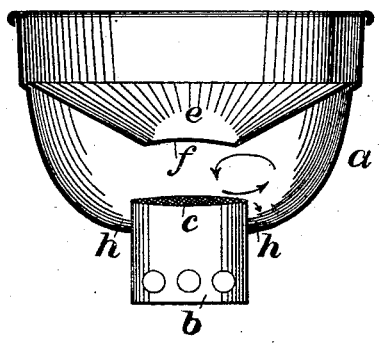
Figure 3:
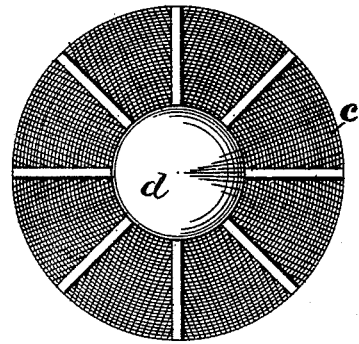
Figure 2:
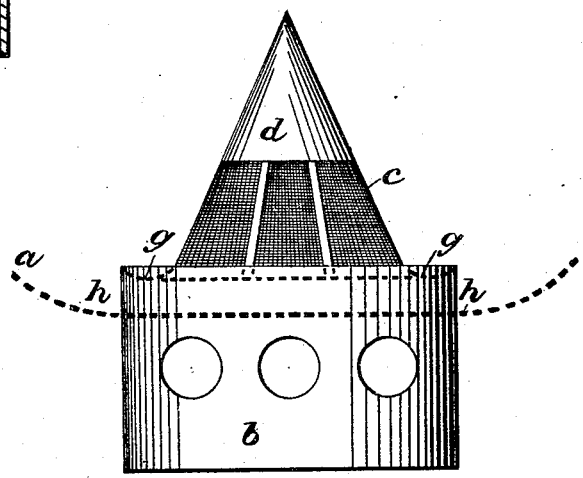

Figures 1 and 4 are central sectional elevations of my strainer. Fig. 2 is a side elevation of the strainer and its base $b$, showing a part of the bowl $a$ in dotted outline. Fig. 3 is a plan view of the strainer.

Like letters refer to like parts.

The object of my invention is to construct a strainer for milk and other liquids that will not clog, but will deposit the silt in a place away from the screen, thus making it self-cleaning.

In the drawings, $a$ is the body of the strainer, into which is passed a cylinder, $b$, so as to project a short distance into it, so as to form an offset or shoulder within the bowl $a$. Upon said cylinder is attached a strainer, $c$, either conical, as shown in Figs. 1, 2, and 3, or convex, as shown in Fig. 4. It may also be made flat, or even concave, and still answer the purpose, though not so well. As shown in Figs. 1, 2, and 3, it is an upward-pointing cone composed of a screen or screens, $c$, surmounted by a solid apex, $d$. The lower part of the screen is (in section) in the form of a parabola, as shown by the heavy lines in Fig. 1; but said base of the screen may also be made flat, or even inclined, like the sides of a flat cone.

Upon the bowl or body $a$ is placed a funnel, $e$, having the discharge $f$ either as a short pipe, which, preferably, is made tapering toward its discharging end, or as a simple opening, as shown in Fig. 4. Said discharge-pipe has its end made to terminate near the base of the solid apex $d$.

When liquids are poured into the funnel $e$, the pipe $f$ concentrates the discharging fluid against the sides of the screen $c$, so as to pass the liquid through it, while the solid matter will glance off and fall down on the base or depression $g$ of the strainer, from which it will be washed off over the side of the cylinder $b$ and fall into the recess or pool $h$. By a well-known law of hydraulics, where the fluid is quiet, and therefore most favorable for the deposit of suspended solids, it will deposit its solid matter. The main current of all the liquid that fails to pass through the screen passes outward in the direction shown by the lower arrow, from which the deposit is formed, which then rises upward and flows back toward the screen, as shown by the upper arrow, most of the liquid passing laterally through the upper part of the screen when the body $a$ is filled to near the base of the cone $d$. The motion of the fluid down the conical screen $c$ is more favorable to cause the revolving motion of the fluid, as indicated.

The apex $d$ of the screen is made solid, for convenience in construction of the cone. It may be a continuous screen, if preferred.

The essential features of my invention are the screen $c$ and shoulder or offset near it, to form the pool for the deposit of sediment which is washed from the screen.

What I claim is—

1. A device for straining liquids, consisting of the bowl $a$, cylinder $b$, and strainer $c$, said cylinder, covered by the strainer $c$, projecting into the bowl, to form the pool $h$ upon the outside of said cylinder, substantially as specified.

2. The bowl $a$ and cylinder $b$, projecting into said bowl, so as to form a pool, $h$, around the outside of said cylinder, said cylinder being covered by a strainer, $c$, in combination with the funnel $e$, substantially as specified.

3. The bowl $a$ and cylinder $b$, projecting into said bowl, so as to form a pool, $h$, around the outside of said cylinder, said cylinder being covered by a strainer, $c$, in combination with the funnel $e$, provided with pipe $f$, substantially as specified.

4. The bowl $a$ and cylinder $b$, projecting into said bowl, so as to form a pool, $h$, around the outside of said cylinder, said cylinder being covered by a conical and upward-pointing strainer, $c$, having depressions $g$ at its base, in combination with a funnel, $e$, having discharge-pipe $f$, substantially as specified.

JOSHUA L. ABELL.

Witnesses:
WM. ZIMMERMAN,
JOHN C. REDHEFFER.